Patented Sept. 22, 1931

1,824,685

UNITED STATES PATENT OFFICE

JOHN W. PITTOCK, OF SWARTHMORE, PENNSYLVANIA

PRESERVING PROCESS

No Drawing. Application filed March 29, 1929. Serial No. 351,125.

This invention relates primarily to processes for treating the waste products of the shrimp industry in the production of a stable non-spoiling food for animals and poultry, and the invention is also useful in the preservation of shrimp and other edible sea products for human consumption.

The principal object of the invention is to provide a novel and practicable process for drying and preserving the waste products of the shrimp industry in a form suitable for consumption by animals and poultry.

Another important object is to provide a novel process for drying and preserving the edible body of the fish for human consumption, said drying and preserving process being capable of practice in any section of the country quite independent of weather conditions.

An incidental object of the invention is to provide processes such as set forth above which shall be highly sanitary and free from objection on the score of production of bad odors.

It is known that a highly desirable food for animals and poultry may be made from the waste products of various sea food industries. The waste products of the shrimp industry, however, while constituting a desirable source for this purpose have prior to my invention been unavailable by reason of the extreme delicacy of the material and its tendency to spoil even in the processes of preservation as heretofore attempted. Also the presence with the viscera, forming a more or less inseparable part of this waste product, of undesirable portions and of foreign and unedible natural substances, has heretofore made this waste unsuitable for production of an edible product.

I have discovered that deterioration in this waste product, consisting largely of the head, viscera and shell of the shrimp and constituting possibly the most unstable and easily spoilable waste product of any of the sea food industries, initiates in the stomach, probably due to the presence therein in greatest abundance of the gastric and other natural juices inherent in the normal structure, and that by rapidly extracting these juices and the undesirable substances previously mentioned before deterioration can set in and preferably simultaneously with a cooking operation, the product may readily be converted into a stable and highly satisfactory food of the character set forth. The rapidity with which my process is carried out is such as to preclude the possibility of spoiling and the product remains untainted and entirely free of the products of deterioration.

In practicing my invention, I place the waste product including the head, viscera and shell of the shrimp in a centrifugal extractor, said extractor preferably being so encased as to permit the admission of steam at desired temperature and pressure whereby the material may be thoroughly cooked simultaneously with the whirling operation. This latter operation results in the extraction from the waste product not only of the juices and excess moisture but also of the undesirable elements of the viscera. The extracted juices, excess moisture and foreign substances may be carried away from the extractor by pipes to a suitable distant point so that with the action of the steam there is no opportunity for the development of bad odors due to deterioration of the extracted juices. The combined extracting and cooking operation is an extremely rapid one consuming not more than five to twelve minutes, so that there is no tendency of the delicate material spoiling during the operation.

Following the extraction operation and thorough cooking, the material when removed from the extractor is found to be in a clean, relatively stable condition, being practically free from any tendency to spoil, and may be subjected without danger and under almost any conditions to a supplemental drying operation, which leaves the material in a substantially dry and practically unspoilable condition. The supplemental drying operation may be carried out in any one of a number of standard mechanical driers available on the market, or the drying operation may be a natural one, as by exposure to air and to the sun's rays. The entire process, including the extraction and cooking operations and the supplemental drying, need consume no more than two hours.

The foregoing process renders available for the production of an edible food for animals and poultry a by-product of a vast industry which heretofore has been considered unavailable for that purpose. By means of this process, a dry, highly stable, shredded or meal-like feed product is obtainable.

I have also found that the process is applicable to the preservation by drying of the body of the shrimp for human consumption. Heretofore the shrimp-drying industry has been confined entirely to certain limited sections of the country in which a certain essential combination of salt air and sunshine is available. The process necessarily is a slow one and is not entirely satisfactory by reason of the aforesaid tendency of the shrimp to deteriorate and the presence in the final product of some elements of deterioration. As also stated above, this deterioration is due primarily to the presence in the meat of natural juices and excess moisture in which the deterioration initiates to spread rapidly through the whole body structure. By rapidly eliminating these juices and the excess moisture, preferably simultaneously with a cooking operation, I have found it quite practicable to produce a dry shrimp which is highly stable and generally more desirable than the shrimp dried by the usual natural processes by reason of a complete absence of deterioration in the meat. My process may be practiced anywhere and quite independently of atmospheric conditions.

In practice, the procedure is essentially the same as that set forth above in connection with the waste product. The shrimp with head and viscera removed is placed in a centrifugal extractor and treated to a simultaneous whirling and cooking operation, the extraction of the juices and moisture and the cooking being so rapid as to preclude the possibility of deterioration setting in during this operation. When removed from the centrifugal extractor, the shell is stripped off and the body of the shrimp constituting the edible portion is then subjected to a supplemental drying operation which results in the production of a substantially dry and stable shrimp which maintains its original form and constitutes a highly desirable edible product.

While primarily valuable in connection with the shrimp industry, as a means for preserving for food purposes a highly unstable product which previously had been considered unavailable for that purpose and as a superior means for preserving the tail of the shrimp for human consumption, the invention will find useful application in the treatment or processing of other sea food products the physical characteristics of which make a special treatment of this character desirable. The method is particularly desirable for preserving fish or large portions of fish in the original form, since by means of the centrifugal action the unstable juices and moisture may be rapidly eliminated without breaking down the body structure. In practicing the invention, there may under some conditions be a variation in the procedure outlined without departure from the invention, which in a broad sense contemplates in a preserving process the rapid elimination of the less stable elements which are largely responsible for a tendency to deterioration. Thus, while it is generally desirable to cook the material simultaneously with the centrifugal action, particularly where the instability of the material requires a processing of maximum rapidity, some of the benefits of the invention may be enjoyed and desirable results obtained by individualizing or separating the extraction and cooking operations.

I claim:

1. The process of manufacturing an edible product, which consists in taking a waste material comprising the head and viscera of shrimp, rapidly eliminating the natural juices and excess moisture from and simultaneously cooking said product, and thereafter bringing the product to substantial dryness by a supplemental drying operation.

2. The process of manufacturing an edible product, which consists in taking a waste material comprising the head and viscera of shrimp, rapidly whirling said material in a centrifugal, and simultaneously subjecting the material to cooking heat, and thereafter bringing the product to substantial dryness by a supplemental drying operation.

3. The process of manufacturing an edible product, which consists in taking a waste material comprising the head and viscera of shrimp, rapidly whirling said material in a centrifugal and simultaneously subjecting the material to the action of steam, and thereafter bringing the product to substantial dryness by a supplemental drying operation.

4. The process of preserving shrimp and similar relatively unstable products, which consists in rapidly extracting the natural juices and excess moisture by centrifugal action and simultaneously cooking the product, and thereafter bringing the product to substantial dryness by a supplemental drying operation.

JOHN W. PITTOCK.